May 19, 1970  J. R. WILSON, JR., ET AL  3,512,870
OPTICAL SCANNING APPARATUS
Filed Aug. 31, 1967  3 Sheets-Sheet 2

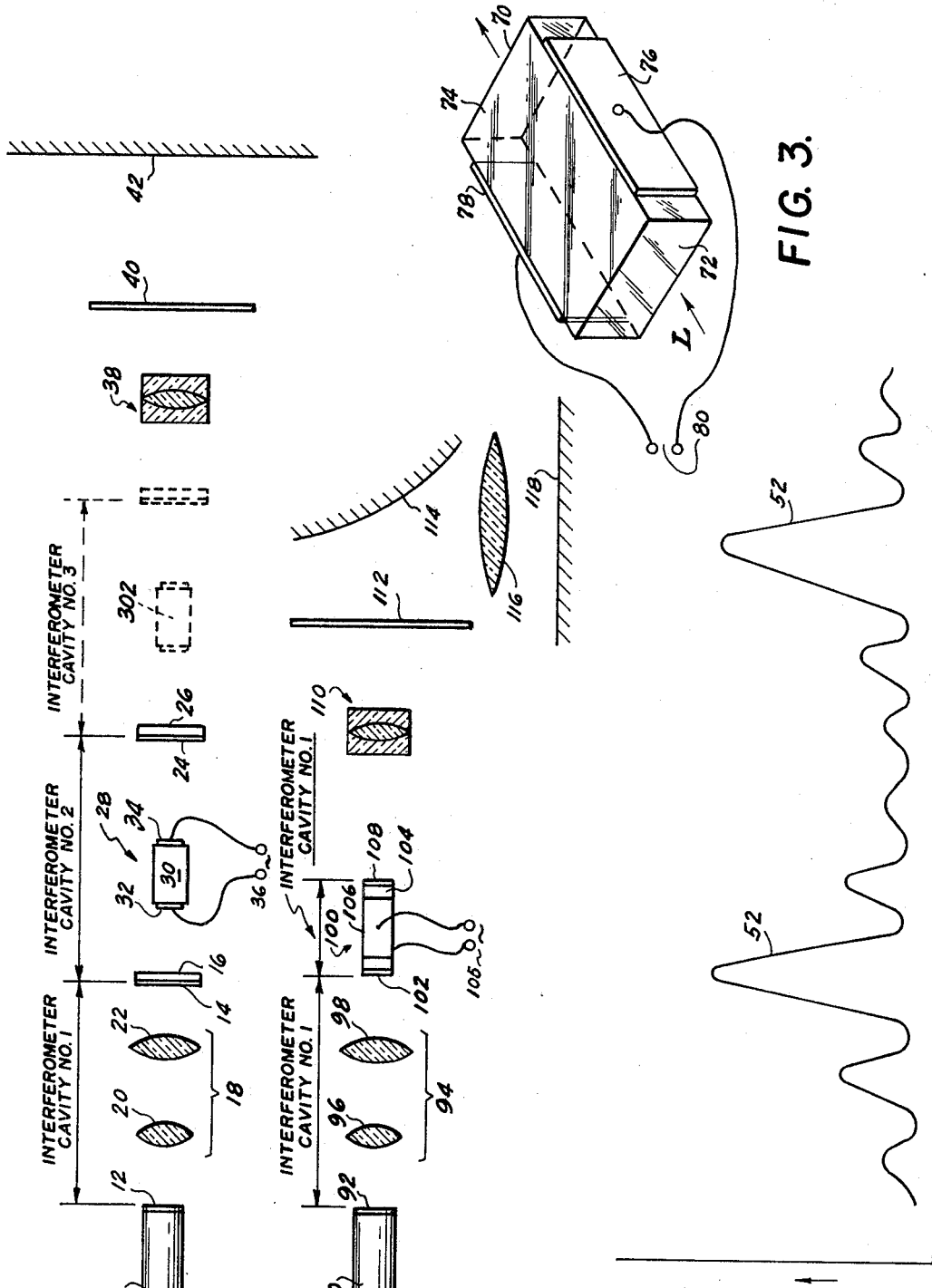

INVENTORS
JOHN RICHARD WILSON JR.
LAWRENCE J. PIEKENBROCK
BY
ATTORNEY

May 19, 1970  J. R. WILSON, JR., ET AL  3,512,870
OPTICAL SCANNING APPARATUS
Filed Aug. 31, 1967  3 Sheets-Sheet 3
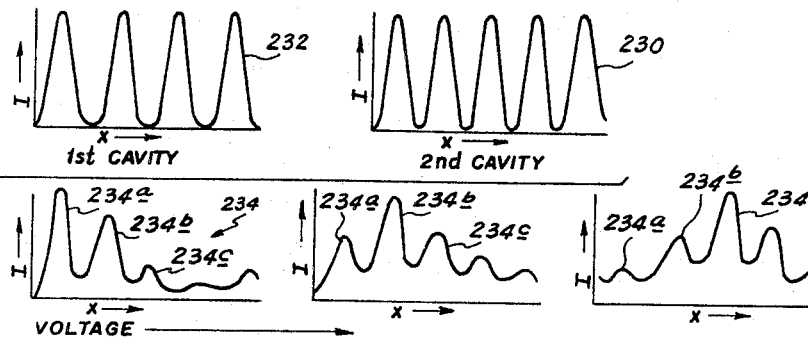
FIG. 8a.
FIG. 8b.
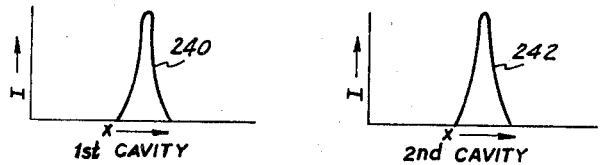
FIG. 9a.
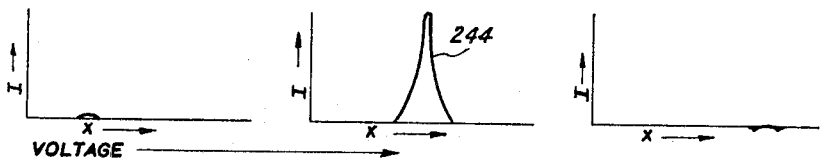
FIG. 9b.
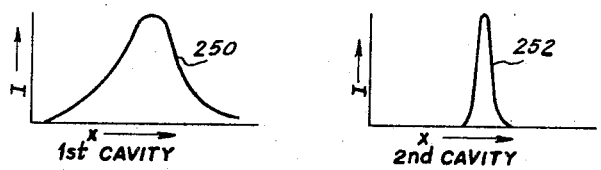
FIG. 10a.
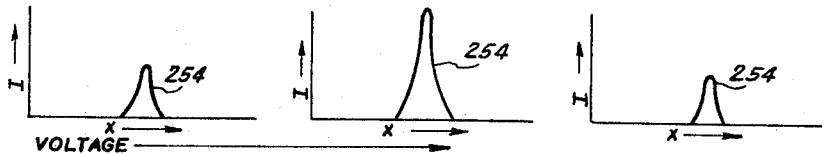
FIG. 10b.
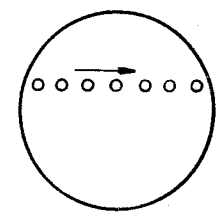
FRINGE PATTERN ON 1st CAVITY MIRROR  FRINGE PATTERN ON 2nd CAVITY MIRROR
FIG. 11a.
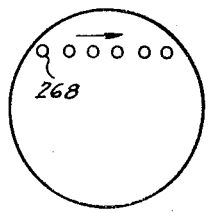 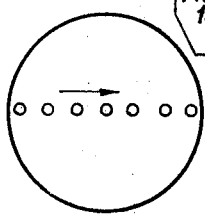
FIG. 11b.
INVENTORS
JOHN RICHARD WILSON JR.
LAWRENCE J. PIEKENBROCK
BY
ATTORNEY United States Patent Office 3,512,870
Patented May 19, 1970

3,512,870
OPTICAL SCANNING APPARATUS
John Richard Wilson, Jr., and Lawrence J. Piekenbrock, Boulder, Colo., assignors, by mesne assignments, to Alexander Dawson, Inc., Mahwah, N.J., a corporation of Delaware
Continuation-in-part of application Ser. No. 636,077, May 4, 1967. This application Aug. 31, 1967, Ser. No. 664,877
Int. Cl. G02f 1/16; G01b 9/02
U.S. Cl. 350—160                 12 Claims

ABSTRACT OF THE DISCLOSURE

Optical scanning apparatus and methods of operation thereof for effecting high frequency displacement of coherent monochromatic light by inducing controlled variation in the index of refraction by application of varying electric fields to a crystal disposed in one of two interferometer cavities connected in tandem. Included herein is the utilization of a second interferometer cavity formed by deposition of reflective surfaces on the faces of a crystal disposed transverse to its optical axis. Various modes of operation as effected by selected tuning of the interferometer cavities are also disclosed.

---

This application is a continuation-in-part of application Ser. No. 636,077, filed May 4, 1967.

This invention relates to optical scanning apparatus and particularly to an improved apparatus for effecting controlled deflection of coherent monochromatic light at high frequencies.

Because of the problems inherent in effecting the acceleration of finite physical masses at high frequencies, there exists distinct limits in the speed at which one can deflect a beam of light to traverse a predetermined distance on a scanning surface by the use of conventional rotating or oscillating mirror techniques. While many systems employing such techniques are known, the compounding of difficulties of control, wave form shape and the strength of materials employed for the higher frequency ranges has effectively limited utilization thereof to relatively low speed applications. While such frequency ranges may be extended somewhat by the utilization of a piezoelectric crystal as the control element to move a reflecting surface in an electromechanical system, the inherent crystal inertia and strength available to withstand or tolerate the mechanical strains produced therein constitute limiting factors that effectively preclude, at least at the present day, the reliable attainment of speeds that are significantly greater than the maximum obtainable from purely mechanical systems of the type set forth above. Avoidance of the limitations inherent in the above noted mechanical and electromechanical systems by the use of electro-optical systems employing the so-called "Pockels" effect and by the use of three dimensional diffraction gratings, neither of which appear to have any significant inherent speed limitation, have been suggested. Systems employing the Pockels effect utilize the production of a linear variation in the index of refraction of a crystal in accord with the magnitude of an applied electric field for control purposes; however, the limited amount of deflection that can be produced thereby, as of the present time, is of such small magnitude as to be practically insignificant. Similarly, three dimensional grating methods, which involve the creation of a three dimensional diffraction grating in a crystal, are characterized by such poor resolution and/or such an extremely small degree of dispersion as to effectively preclude their utilization, at least by present day techniques, for the purposes of effecting significant degrees of beam deflection at megacycle frequencies. A third electro-optical system incorporating an interferometer in association with monochromatic light and a crystal exhibiting the Pockels effect has been recently suggested for use as a possible expedient for the effecting of high frequency deflection of light beams. However, information available indicates that such suggested system, because of its production of an unmodulated fringe pattern, is limited in the degree of deflection obtainable to the distance between adjacent fringes.

This invention may be briefly described as an improved construction for electro-optical scanning systems of the type employing an interferometer in association with a crystal exhibiting the Pockels effect and which, in its broad aspects, includes the utilization of multiple interferometer cavities to selectively vary the attenuation of particularly located fringes to effectively increase the spacing of intermediate unattenuated fringes and thereby markedly increase the finesse of the system. It also broadly includes the utilization of selective modulation techniques to vary the intensity characteristics of particular fringes. In more narrow aspects, the subject invention includes an improved combinational construction for an integral interferometer cavity-control crystal element utilizable in the subject scanning systems.

Among the advantages of the subject invention is the provision of beam deflection systems of improved finesse quality and capable of deflecting a beam of coherent monochromatic light at megacycle deflection rates through distances in excess of five hundred spot diameters. Other advantages flow from the selective fringe attenuation capability through selective modulation thereof and its permitted use for information encoding purposes.

The primary object of this invention is the provision of improved apparatus for effecting the controlled deflection of coherent monochromatic light at frequencies up to and including the megacycle range.

Another object of this invention is the provision of an improved construction for a combinational control crystal-interferometer cavity element.

Other objects and advantages of the subject invention will be pointed out in the following specification and will become apparent to those skilled in this art from the accompanying drawings which illustrate a presently preferred construction for a scanning device incorporating the principles of this invention.

Referring to the drawings:

FIG. 1 is a schematic line drawing, in elevation of the arrangement of major components in apparatus constructed in accordance with the principles of this invention.

FIG. 2 is a plot illustrating the intensity distribution pattern resulting from the practice of this invention and compared with that resulting from the use of a single interferometer cavity.

FIG. 3 is an oblique view illustrating a preferred crystal construction for use in the practice of this invention.

FIG. 4 is a schematic line drawing, in elevation, of an alternate component arrangement utilizable in accordance with the principles of this invention.

FIG. 8a is a schematic graphical representation of the general character of suitable fringe intensity patterns to be produced in the first and second interferometer cavities for effecting operational mode D.

FIG. 8b is a sequential set of schematic graphical representations of the composite or output fringe pattern obtained from the intensity patterns of FIG. 8a and is illustrative of the nature and character of operational mode D.

FIG. 9a is a schematic graphical representation of the general character of suitable fringe intensity patterns to be produced in the first and second interferometer cavities for effecting operational mode E.

FIG. 9b is a sequential set of schematic graphical representations of the composite or output fringe pattern obtained from the intensity patterns of FIG. 9a and is illustrative of the nature and character of operational mode E.

FIG. 10a is a schematic graphical representation of the general character of suitable fringe intensity patterns to be produced in the first and second interferometer cavities for effecting operational mode F.

FIG. 10b is a sequential set of schematic graphical representations of the composite or output fringe pattern obtained from the intensity patterns of FIG. 10a and is illustrative of the nature and character of operational mode F.

FIG. 11a is a schematic plan view of the general character of suitable fringe intensity patterns to be produced on the end mirrors of the first and second interferometer cavity mirrors for effecting operational mode G.

FIG. 11b is a sequential set of schematic plan view representations of the composite or output intensity pattern that is illustrative of the nature and character of operaional mode G.

Figure 5A:
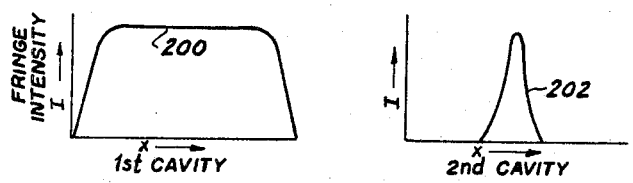
FIG. 5a is a schematic graphical representation of the general character of suitable fringe intensity patterns to be produced in the first and second interferometer cavities for effecting operational mode A.
Figure 5B:
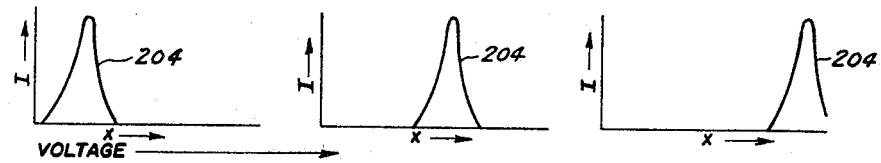
FIG. 5b is a sequential set of schematic graphical representations of the composite or output fringe pattern obtained from the intensity patterns of FIG. 5a and is illustrative of the nature and character of operational mode A.

For the purposes of simplicity and clarity, the essential components of the subject apparatus are illustrated in schematic line form. As is recognized by those familiar with the optical arts, the components of the interferometric system should be securely fixed relative to each other for successful operation and, also, should be so mounted as to permit adjustment of component position and axial alignment. As such, it should be understood that in an operative setup, the various component elements and subassemblies could be mounted in such manner as to permit highly accurate mechanical alignment and both coarse and fine degrees of adjustment thereof on a suitable vibration-free base. The use of a suitably mounted straight alignment rail as a convenient means of maintaining rough alignment among the components while effecting rough adjustment of spacing in conjunction with individually adjustable mounts of the type disclosed in copending application Ser. No. 636,095, filed May 4, 1967, now Pat. 3,436,050 of Apr. 1, 1969, has been found to be satisfactory.

As pointed out earlier, the subject invention, in its broad aspects, utilizes a pair of interferometer cavities disposed in tandem for the production of widely separated interferometric fringes of high intensity with control modulation being effected within the second cavity to effect fringe displacement. A suitable arrangement of the essential component elements to achieve such results is illustrated in FIG. 1 and includes a source 10 of coherent monochromatic light. Such source 10 is conveniently constituted by a continuous wave, gas or crystal laser. Desirably the laser tube per se should be removed from its power supply and mounted so as to facilitate matching of its emitted beam to the center axis of the critical end mirror 12 thereof. The laser end mirror 12 defines one end of a first interferometer cavity, the other end of which is defined by the reflective surface 14 of a second mirror element 16. Disposed within the first interferometer cavity is a telescopic subassembly, generally designated 18 for effecting transfer of the image beams, in coherent fashion, to the second mirror with a desired degree of magnification, and to effectively shorten the optical length of the cavity. The nature of the telescopic lenses, such as the lenses 20 and 22, will be determined by the magnification desired at the reflective surface 14 of the second mirror element 16. The mirror and telescope elements are positioned so that the mirrors 12 and 16 are selectively located at the exit and entry pupils of the telescope system. The telescopic lenses should be of such character as to present, with small distortion, a magnified image of the laser beam for the production of interference fringes characteristic of either a Fabry-Perot or a Fizeau interferometer at the second mirror. Characteristic of a Fabry-Perot interferometer, parallel disposition of the reflective surface 14 of the second mirror 16 with the laser end mirror 12 will result in the production of a set of concentric fringes at the second mirror surface. If the reflective surface 14 is then tilted about its horizontal or vertical axis to form a wedge-shaped cavity, a set of straight Fizeau type fringes will be produced at the second mirror. As will now be apparent, utilization of a small segment of a Fabry-Perot fringe will approximate a straight line Fizeau type fringe. The relatively close spacing of the fringes in the single cavity, however, effectively limits the number of spot diameter deflections that can be obtained from the system.

In accordance with the principles of this invention, a second interferometer cavity is placed in tandem with the above described first cavity. As shown in FIG. 1, the second interferometer cavity is formed by the aforesaid reflective surface 14 of the second mirror 16 and the reflective surface 24 of a third mirror element 26. The intensity distribution of such a system under illumination by monochromatic light is apparently generally equal to the product of the relative intensity distributions of the fringes produced by each separate cavity and has a qualitative distribution pattern as illustrated by the solid line curve 52 of FIG. 2 which is tunable to selectively provide optimum intermediate fringe attenuation. Actually, the first interferometer cavity may be considered as filter transmitting beams in selected directions to the second cavity. When such beams have the correct directional and phase characteristics, they are further transmitted and produce a final pattern having peak intensities determined by the separate peak transmission factors.

Disposed within the second interferometer cavity is a control crystal assembly, generally designated 28. Such assembly preferably includes a crystal 30 capable of exhibiting the Pockels effect. Secured to the appropriate crystal faces are electrode elements 32, 34 connected to an external source of high voltage 36 capable of being oscillated over a wide range of frequencies.

When the interferometer cavities are adjusted to provide for optimum fringe intensity distribution, application of high voltage to the electro-optic crystal 30 produces an electric field across the crystal, a linear variation in the index of refraction of the crystal in accord with the magnitude of the applied electric field and a concomitant change in the phase of the incident light. Such variation in phase effects a change in the optical path length within the interferometer cavity and is equivalent to altering the distance of separation of the interferometer mirrors. The alteration of the effective length of the second interferometer cavity produces a displacement of the fringes in a direction perpendicular to the length thereof across the field of view. If the voltage applied to the crystal 30 is of an alternating character, the fringes will oscillate at the applied frequency. Additionally the rate of displacement will be determined by the rate of change of the applied voltage.

Such motion or reciprocative displacement of the straight line Fizeau fringes or segments of the Fabry-Perot fringes is projected through an auxiliary projection lens assembly 38 and, after merging into a high intensity spot by an adjacent elongate cylindrical lens element 40, is focussed on a scanning surface 42.

In installations where the length of the second interferometer cavity becomes excessive, it may be desirable to include therein, on either side of the control crystal, a telescopic subassembly such as is included in the first interferometer cavity and heretofore described.

Insofar as the interferometer cavities and the defining mirror elements are concerned, mirror thickness is not critical except as it affects dimensional stability of the mirror surfaces and interferometer performance is determined by the mirror element transmission, absorption and reflection coefficients, which are related as $$R+T+A=1$$

In accord therewith, the provision of the sharpest possible fringes with the highest peak transmission requires mirrors of high reflectivity and low absorption. Desirably mirrors having the lowest possible absorption and scattering with their surfaces disposed parallel and optically flat to within $\lambda/100$ are employed and have their reflective surface formed of multilayer dielectric coatings so constituted as to provide for desired reflectivity at the wave length of the laser beam. Similarly, high quality optical elements should be employed for the telescope assembly 18 in order to transfer the image beams in parallel coherent fashion to the second mirror.

The optical parameters of the control crystal also critically influence system performance. The crystal may be of the type possessing tetragonal or similar symmetrical structure and must be disposed so that its optic or Z axis is parallel to the incoming laser beam. A suitable crystal is KDP (potassium dihydrogen phosphate) preferably enriched with deuterium, having minimal internal optical absorption and a relatively large light entrance aperture. As pointed out at a later point herein, lithium niobate crystals are also possessed of particularly desirable qualities that render them suitable for use. In order to secure the desired uniformity of phase retardation of the incident light beam, the surfaces of the crystal disposed perpendicular to the Z or optic axis must be polished to maximum of attainable flatness desirable of $\lambda/100$ and with deviation from parallelism of no more than a few seconds of arc.

The electrode elements 32, 34 for applying of the electric field across the crystal parallel to the optic axis, may comprise deposited gold rings or other deposited grid structures. Alternatively, deposited transparent electrodes, through which the incident light passes, may also be used. The crystal will, of course, be mounted in a suitable holder containing electrode contacts and necessary insulation to prevent shorting at high voltages.

A preferred construction for an electro-optic crystal assembly is illustrated in FIG. 3. As there illustrated, the crystal 70 is preferably formed of lithium niobate and is of generally rectangular configuration with its light receiving surfaces polished flat to within $\lambda/100$ and with deviation from parallelism of no more than a few seconds of arc. Lithium niobate crystals, because of their non-hygroscopic nature, permit very high tolerance surface grinding and remove some need for environmental controls with the attendant advantageous properties of more uniform modulation and availability of larger apertures for reception of incident light. As illustrated, the crystal is oriented so as to position its optical transmission path perpendicular to the electrode mounting surface. If desired, the light receiving surfaces of the lithium niobate crystal may be provided with multilayer dielectric coatings to form reflective surfaces 72 and 74 thereon to thereby permit the crystal itself to serve as the second interferometer cavity. For the illustrated lithium niobate crystal 70 application of the electric field transversely to the optical axis is effected by means of a pair of deposited electrodes 76, 78 connectable to a source 80 of high frequency, high voltage electric power.

FIG. 4 illustrates the inclusion of the preferred type of lithium niobate crystal of the specific construction shown in FIG. 3, in a scanning system. A laser 90 is employed to provide a beam of coherent monochromatic light and the laser end mirror 92 serves as one defining terminus of the first interferometer cavity. The other terminus of the first cavity is constituted by the reflective mirror surface 102 disposed on the facing surface of the control crystal 104. As previously described, a telescope assembly 94, schematically represented by lens elements 96 and 98, is included within the first interferometer cavity. As illustrated, the second interferometer cavity is constituted by the reflective coatings 102 and 108 on the crystal surfaces disposed transverse to the electric field. The crystal assembly 100, which, as above pointed out, now per se constitutes the second interferometer cavity, is also provided, at its sides facing toward and away from the viewer, as viewed on FIG. 4, with a pair of electrode elements 106 connected to a source of high frequency high voltage 110 for application of an electric field thereto. The selectively attenuated fringe output of the second interferometer cavity is passed through projection lens assembly 110 and an adjacent cylindrical lens 112 and is imaged on a curved reflector surface 114. As the fringes are displaced by application of high voltage to the crystal, the image traverses the curved reflector surface and the reflected ray therefrom is passed through a second projection lens 116 onto a scanning surface 118 to provide thereby an amplified length of scan.

As will now be apparent from the foregoing, the subject system effectively renders possible, the deflection of a laser beam capable of producing deflection in excess of 500 spot diameters over a wide range of frequencies including the megacycle ranges and, at such speeds, to provide sufficient intensity as to readily permit external sensing of variations in reflected or transmitted intensities thereof. By way of example, the coupling of the subject system with auxiliary means for locating the spot at any given instant of time and rendering said spot location information in digital form, as disclosed in copending application Ser. No. 636,095, filed May 4, 1967, provides a highly useful tool for data scanning, character recognition and data storage systems.

Operation of the system to date has exhibited not only the desired fringe motion but has produced certain other phenomena which are presently believed to flow from the multiplicative nature of the tandem operation of the dual interferometer cavities. Among these are fringe motion accompanied by fringe division and complementary intensity modulation of adjacent stationary fringes.

FIGS. 5 through 11 schematically illustrate the general nature of some of the modulated fringe intensity patterns that are obtained through the use of the subject invention and which are indicative of the wide range of potential utilization thereof. Except for the showings of FIGS. 11a and 11b, the remaining figures are graphical in nature and plot the intensity (I) of the fringe pattern as the ordinate and the distance (X) of the observed fringe from an arbitrary location (for example, the distance from the end of the mirror) as the abscissa in a conventional Cartesian coordinate type of presentation. For convenience, the hereinafter described composite fringe intensity patterns resulting from various modulation techniques will be designated as "operational modes" followed by an identifying letter.

OPERATIONAL MODE A

Operational mode A, which may be considered as a basic analog sweep mode, is obtained when, as illustrated in FIG. 5a, the angularity and reflectance of the first interferometer cavity is adjusted, for example, through end mirror manipulation, to produce a single broad flat fringe 200 and the second interferometer cavity is operated at a high finesse with only one or two narrow fringes 202 visible to the eye. The composite output of the dual cavity unit will then constitute a single high intensity fringe 204 whose position or physical location as shown by the adjacent plots will be continuously related or determined by the magnitude of the voltage applied to the electro-optic crystal disposed in the second interferometer cavity. As heretofore described the output fringe 204 is readily converted into a beam or dot for scanning purposes.

OPERATIONAL MODE B

Figure 6A:
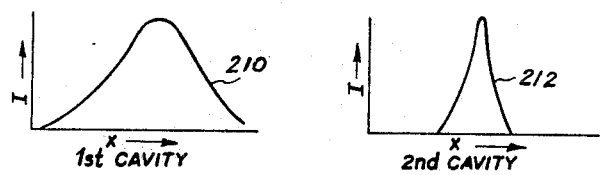
FIG. 6a is a schematic graphical representation of the general character of suitable fringe intensity patterns to be produced in the first and second interferometer cavities for effecting operational mode B.
Figure 6B:
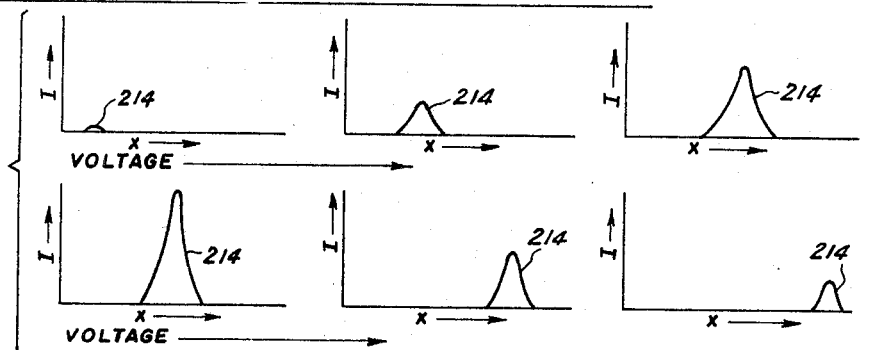
FIG. 6b is a sequential set of schematic graphical representations of the composite or output fringe pattern obtained from the intensity patterns of FIG. 6a and is illustrative of the nature and character of operational mode B.

Operational mode B, which may be conveniently termed an analog modulation sweep mode, is obtained by tuning the first interferometer cavity to produce one (or several) relatively low finesse broad fringes 210 and operating the second interferometer cavity at high finesse to produce one or two narrow fringes 212 as illustrated in FIG. 6a. As shown in FIG. 6b, the composite output is a single fringe 214 whose position or physical location will be determined by the magnitude of the voltage applied to the electro-optic crystal, as was the case in operational mode A, with the exception that here the single output fringe 214 will also be effectively intensity modulated in general correspondence with the intensity variations of the relatively broad fringes produced by the first cavity.

Operational mode B thus produces a variation in light intensity as the output fringe is physically displaced by the applied voltage.

OPERATIONAL MODE C

Figure 7A:
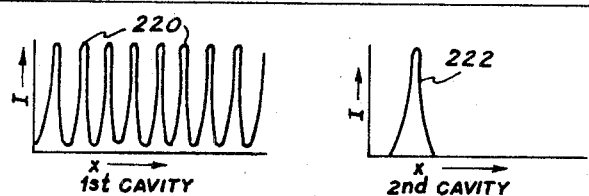
FIG. 7a is a schematic graphical representation of the general character of suitable fringe intensity patterns to be produced in the first and second interferometer cavities for effecting operational mode C.
Figure 7B:
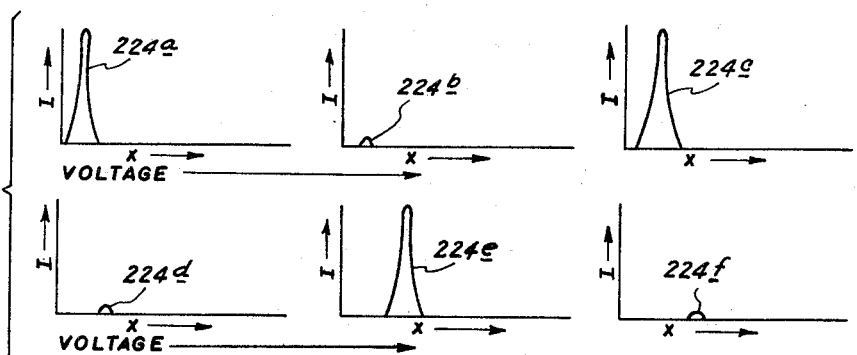
FIG. 7b is a sequential set of schematic graphical representations of the composite or output fringe pattern obtained from the intensity patterns of FIG. 7a and is illustrative of the nature and character of operational mode C.

Operational mode C, which may be conveniently considered as a digital sweep mode, is obtained by tuning the first interferometer cavity in such manner as to produce a number of narrow fringes 220 at low to medium finesse and tuning the second interferometer cavity at high finesse to produce one or two narrow fringes 222, as shown in FIG. 7a. The composite output beam 224 will, as its physical location varies in accord with the voltage applied to the electro-optic crystal, sharply vary in intensity as illustrated by the FIG. 7b sequence 224a, b, c, d, e and f as the second cavity fringe traverses those of the first cavity and with the number of such variations being directly related to the number of fringes 220 produced in the first cavity. As will be apparent, application of the voltage to the electro-optical crystal will result in a pattern of high and low intensity fringes and in the ultimate production of a sharply defined essentially "on-off" type intensity modulated pattern.

OPERATIONAL MODE D

Operational mode D, which may be considered as a finesse amplification mode, is achieved by operating both the first and second cavities at high finesse and with a large number of fringes in each field. As shown in FIG. 8a, the number of fringes created in the second cavity 230 is adjusted to be somewhat greater or less than the number of fringes 232 created in the first cavity, i.e., the period of intensity variations in the fringes of the two cavities is adjusted to be somewhat different. The composite output of these modes, as illustrated in FIG. 8b, consists essentially of a fan of beams 234 including a maxima 234a and a series of spaced minima 234b, 234c which decrease rapidly in intensity. The application of a driving voltage to the electro-optic crystal will cause a transfer of the maxima to a new location in a pattern determined by the comparative number of fringes in each cavity and by the applied voltage.

OPERATIONAL MODE E

Operational mode E, which may be considered as a switching mode, is obtained by operating both the first and second cavities at high finesse and with only one or two fringes such as 240 and 242 in their respective fields, as shown in FIG. 9a. The composite output effectively constitutes a pulse of light as the driving voltage applied to the electro-optical crystal sweeps the second cavity fringe 242 past the fringe 240 in the first cavity. The resultant sharp intensity pulse 244, as shown in FIG. 9b can be of extremely short duration, largely depending upon the frequency of the sweep voltage and the physical dimensions of the cavities, and through the technique described it is possible to effectively achieve relatively high intensity light pulses that are shorter than a tenth of a nanosecond in duration.

OPERATIONAL MODE F

Operational mode F, which may be considered as a pulse modulation mode, can be obtained by locating the electro-optical crystal in the first interferometer cavity intermediate the lens 22 and mirror 14. With the crystal so located and with the first cavity tuned to produce a single or several broad low finesse fringes 250, as shown in FIG. 10a and with the second cavity operated to produce a single or several high finesse fringes 252, application of the sweep voltage to the electro-optical crystal results in a nonmoving or nondisplaceable output beam 254, whose intensity is modulated by the driven fringe envelope of the first cavity, as shown in FIG. 10b.

OPERATIONAL MODE G

Operational mode G, which may be considered as a raster type mode of operation, is obtained by disposition of the crystal in the second interferometer cavity. As shown in schematic plan view in FIG. 11a, the first cavity is tuned to provide a plurality of sharply defined high finesse straight-line fringes 260. The second cavity is tuned to provide a single high finesse fringe 262 disposed at a predetermined skew angle 264 relative to the fringes 260 of the first cavity. As a sweep voltage is applied to the electro-optical crystal in the second cavity, the fringe 262 will be displaced in the direction indicated by the arrows 266. Such displacement of the angularly disposed or skewed fringe 262 relative to the first cavity fringes 260 will result in the composite production of a point trace of light 268 which traverses the output screen in the direction indicated by the arrows in FIG. 11b. In this illustrated embodiment the horizontal scan will be continuous in nature and in contradistinction therewith, the vertical scan will be essentially incremental in nature with the number of composite trace lines depending upon the number of horizontal fringes produced in the first cavity.

In addition to the foregoing, X–Y motion of the resultant spot patterns that are obtainable from any of the above described modes of operation can be achieved by the addition of a third interferometer cavity adjacent the output mirror 26 of the second interferometer cavity, as illustrated in dotted lines in FIG. 1, having a second electro-optic crystal 302 disposed therein. The third interferometer cavity will then be operated in such a way as to produce fringes perpendicular to those produced in the second cavity. Such operation will then result in production of a spot pattern that requires no cylindrical focussing lens 40 although a projection lens will still be required in most instances. By the use of such a third interferometer cavity and with a second electro-optical crystal disposed therein, the composite output spot can be driven to any desired point in the X–Y field by application of appropriate voltages to both of the control crystals.

These modes of possible operation offer considerable promise for use in conjunction with high speed recording of information by photographic techniques, data display systems, and information encoding for communication systems. Many other fields of utility will be apparent to those skilled in this art.

Having thus described our invention, we claim:

1. Optical apparatus comprising
   laser means for emitting a beam of coherent monochromatic light,
   a first interferometer cavity positioned to receive said emitted laser beam and provide a first interferrometric fringe pattern,
   a second interferometer cavity positioned in tandem with said first cavity to receive the light emitted therefrom and to provide in at least a portion of its field substantially straight line output fringe pattern of modulated intensity, and
   crystal control means disposed in the light path in one of said cavities and responsive to the application of electric potential for varying the phase of the light passing therethrough.

2. Apparatus as set forth in claim 1 wherein said crystal control means is disposed in said second interferometer cavity.

3. Apparatus as set forth in claim 2 including means for varying the electric potential applied to said crystal control means in a predetermined manner to effect a complemental displacement of the transmitted fringe pattern from the second interferometer cavity.

4. Apparatus as set forth in claim 1 including means for focussing the transmitted straight line fringe pattern into a spot.

5. Apparatus as set forth in claim 2 wherein said second interferometer cavity is defined by reflective surfaces on the crystal control means.

6. Apparatus as set forth in claim 1 wherein said crystal control means is externally modulated to produce intensity modulation of adjacent fringes.

7. An interferometer cavity comprising a crystal body portion having a pair of opposed reflective surfaces disposed substantially perpendicular to the path of light therethrough.

8. An interferometer cavity as set forth in claim 6 including means for applying an electric field to the crystal body portion to vary the phase of light passing therethrough.

9. Apparatus as set forth in claim 1 including a telescopic subassembly disposed in at least one of said interferometer cavities to effectively shorten the optical length of such cavity.

10. Apparatus as set forth in claim 1 including a telescopic subaassembly disposed in each interferometer cavity to effectively shorten the optical length thereof.

11. In the operation of a laser beam deflection system incorporating first and second interferometer cavities disposed in tandem in the path of the laser beam, the steps of
    selectively tuning the first interferometer cavity to provide a first interferometric fringe pattern of a predetermined character therein,
    selectively tuning the said second interferometer cavity to provide a substantially straight line fringe pattern of a second predetermined character therein and
    phase modulating the portion of the laser beam as it passes through at least one of said cavities to provide a modulated system output pattern of third predetermined character.

12. The method as set forth in claim 11 wherein said phase modulation of said laser beam is effected in said second interferometer cavity.

References Cited

UNITED STATES PATENTS

| 3,134,837 | 5/1964 | Kisliuk et al. | 331—94.5 |
| 3,243,722 | 3/1966 | Billings | 331—94.5 |

FOREIGN PATENTS

| 1,459,422 | 10/1966 | France. |
| 1,340,840 | 9/1963 | France. |

RONALD L. WIBERT, Primary Examiner

T. MAJOR, Assistant Examiner

U.S. Cl. X.R.

331—94.5; 356—112